(12) United States Patent
Dick (10) Patent No.: US 6,392,314 B1
(45) Date of Patent: May 21, 2002

(54) WAVE ENERGY CONVERTER

(76) Inventor: William Dick, Redbog, Blessington, County Wicklow (IE)

( * ) Notice: Subject to any disclaimer, the term of this patent is extended or adjusted under 35 U.S.C. 154(b) by 0 days.

(21) Appl. No.: 09/555,808

(22) PCT Filed: Dec. 3, 1998

(86) PCT No.: PCT/IE98/00101

§ 371 Date: Jun. 5, 2000

§ 102(e) Date: Jun. 5, 2000

(87) PCT Pub. No.: WO99/28623

PCT Pub. Date: Jun. 10, 1999

(30) Foreign Application Priority Data

| Dec. 3, 1997 | (IE) | S970855 |
| Jul. 28, 1998 | (IE) | S980633 |
| Nov. 23, 1998 | (IE) | S980973 |

(51) Int. Cl.[7] .................................................. F03B 13/10
(52) U.S. Cl. ............................ 290/53; 60/507; 417/331
(58) Field of Search ............................. 290/53, 42, 43, 290/54; 60/507; 417/331

(56) References Cited

U.S. PATENT DOCUMENTS

| 3,930,168 A | * 12/1975 | Tornabene | 290/53 |
| 4,355,511 A | * 10/1982 | Jones | 60/507 |
| 4,742,241 A | 5/1988 | Melvin | 290/53 |
| 4,754,157 A | * 6/1988 | Windle | 290/53 |
| 4,883,411 A | * 11/1989 | Windle | 417/331 |
| 5,394,695 A | * 3/1995 | Sieber | 60/398 |
| 6,229,225 B1 | * 5/2001 | Carroll | 290/53 |

FOREIGN PATENT DOCUMENTS

| FR | 892537 | 4/1944 |
| FR | 2 278 942 | 2/1976 |
| FR | 2 449 801 | 9/1980 |
| FR | 2 488 339 | 2/1982 |
| GB | 2 033 488 | 5/1980 |
| WO | WO 97/41349 | 11/1997 |

* cited by examiner

Primary Examiner—Nicholas Ponomarenko
(74) Attorney, Agent, or Firm—Young & Thompson (57) ABSTRACT

A device for extracting energy from a water body (4) comprises a buoyant member of variable buoyancy (6) which is at least partially submerged in the body of water (4). The buoyant member of variable buoyancy (6) contains a fixed mass of gas (7), the volume of which changes as a result of the pressure changes exerted on the buoyant member (6) by waves (10,11) and/or other changes in the water level above. The buoyant member (6) is preferably constructed from a substantially air-tight, flexible or otherwise elastic material, whereby the volume of the buoyant member of variable buoyancy (6) may alter in response to changes in the volume of gas (7) contained therein. The pressure changes result in volume changes of the gas contained within the variably buoyancy, which causes fluctuations in volume of the variable buoyancy. As a result of changes in volume a change in buoyancy occurs. This results in a corresponding change in upthrust exerted by the variable buoyancy (6) which affects the forces exerted on an energy conversion unit (8).

29 Claims, 12 Drawing Sheets

WAVE ENERGY CONVERTER

The invention relates to a point absorber wave energy converter, comprising in part an underwater device which derives power from buoyancy variations arising from changes in pressure caused by waves and/or changes in the level on the surface above and which reacts against either the bottom or a second vessel floating on the surface above. The term "wave motion" as used herein refers to both waves on a surface of a liquid and swell in a body of a liquid.

BACKGROUND

Quest for Economic Sources of Renewable Energy

The oil crisis in the early 1970's was the impetus for much of the pioneering work into wave energy conversion. A lack of practical solutions or reasonable prospects of efficient and robust technologies, plus declining oil prices, led to a general disenchantment. Research continued at a few largely academic centres and over the past twenty-five years a great deal has been learnt. Both theoretical understanding of sea waves and technical expertise in related marine engineering has gained immeasurably from the offshore oil and gas industries during the same period. Growing concern with global climate change has led to an increased sense of urgency in the quest for commercially viable renewable energy sources.

The Size of the Wave Energy Resource

The theoretical potential of wave energy has been recognised for many years. The size of this resource has been estimated to be 219 gigawatts along the coats of the European Union, or more than 180 terawatt hours each year. The wave power off the west coasts of Ireland and Scotland, where the winter resource is approximately twice that available during summer months, ranks with the highest levels per kilometre in the World.

Wave energy is lost by friction with the sea bottom as the sea becomes shallow (water depths of half a wavelength or less). This is most pronounced where wavelengths tend to be long, as off the NW coast of Europe.

Development of Wave Energy Converters

Research and development into wave energy converters (WECs) over the past twenty-five years, plus the knowledge and practical experience gained from the off-shore oil and gas industries, has now reached a stage where robust and effective wave energy converters with installed capacities of one megawatt and greater are being developed.

The wave energy resource may be split into three broad categories, based on where the energy from waves may be recovered:

1. in the open sea, i.e. offshore
2. on or close to the shore line, i.e. on-shore or inshore
3. outside the normal area of breaking waves but not in the deep ocean, i.e. near shore.

A fourth category, not generally considered in the context of wave energy converters, but which may be of relevance to this present invention, is waves or surges in a liquid contained in vessels and tanks.

The very large number of devices and concepts proposed to date has been classified and described in summary form for the Engineering Committee on Oceanic Resources by the Working Group on Wave Energy Conversion (ECOR draft report, April 1998). This follows a similar classification based on the intended location, i.e. off-shore, near shore to off-shore, and on-shore.

Wave Energy Converters (WECs) may also be classified in different ways according to their operating principle and the ways in which they react with waves. In terms of practical application, only a very few types of device are presently, or in the recent past have been, in use or under test in European waters.

By way of illustration, two different but overlapping classes will be briefly commented on: the Oscillating Water Column (OWC) devices and Point Absorbers, the latter being the relevant class in the present context.

OWC devices are typically those where the wave is confined in a vertical tube or a larger chamber and, as it surges back and forth, drives air through a power conversion device. Megawatt-scale OWC devices are now at an advanced stage of development. One such device, being built in a rocky gully on the western shore of Pico in the Azores, is a reinforced concrete chamber partly open at one side to the waves, and with two turbines above and behind through which the confined air is forced. These are specially developed Wells turbines (one with variable blade pitch) and on the whole would seem to be the best-developed and perfected conversion system available today. It is, however, unlikely that any one such installation will have an installed capacity greater than two megawatts and the number of suitable sites has to be extremely limited.

Point absorbers may react against the sealed (therefore necessarily sited near-shore), or be floating and self-reacting. Theoretical analysis has greatly increased our understanding of point absorbers.

Point absorbers are usually axi-symmetric about a vertical axis, and by definition their dimensions are small with respect to the wavelength of the predominant wave. The devices usually operate in a vertical mode, often referred to as 'heave'. As such they are capable of absorbing energy arising from changes in the surface level rather than from forward motion of breaking seas. The theoretical limit for the energy that can be absorbed by an isolated, heaving, axi-symmetrical device has been shown to depend on the wavelength of the incident waves rather than the cross section of the device, i.e. from the wavelength divided by $2\pi$. Thus the wavelength is a critically important criterion, resulting in the attraction of locating the point absorber devices well outside the region of breaking waves, and where they will be open to long wavelength ocean swell or 'heave'. A point absorber device may react against the inherent inertia of one of its components, or against the bottom of the sea. Thus, point absorbers may be deployed near-shore in contact with the sea-bed or, in the case of self-reacting devices, near-shore or off-shore.

Small-scale practical point absorbers such as fog horns and navigation buoys, both of which may incorporate OWCs, have been in use for decades. Typically these have a power of a few hundred watts.

One new point absorber device, now claimed to be capable of generating of the order of a megawatt, is described in International Application WO 95/117555. This is based on the buoyancy variations of a submerged, partly air filled, rigid vessel open at the bottom. Initially the device is floating with neutral buoyancy at a certain depth. If a wave passes above it the pressure around this vessel increases and water will flow into the vessel, displacing the air or gas inside (which is free to flow to a large reservoir or to similar devices linked by pipelines), decreasing the air volume in it and hence its buoyancy. The upthrust experienced has decreased in proportion to the volume of water displaced, i.e. Archimedes' principle. The partially filled vessel will start to sink. When a trough passes above it the reverse process occurs, and the vessel tends to rise to recover its rest position. The size of the forces exerted will depend on the extent of the water surface within the vessel, the amplitude of the wave and the frequency of waves. WO 95/17555 describes the wave energy transformer in terms of two similar containers, horizontally displaced, such that the gas displaced from one container passes to the second. Essentially the gas, being free to move between two or more similar devices remains under constant pressure, as required by the depth below the surface.

International Application WO 95/117555 as described, and its subsequent developments is a heavily engineered device, one that will not readily flex with the lateral movements of water as found below waves, it is not independent of the seabed and is not independent of tidal changes in mean sea level. The base or centre of the device is fixed in its position with respect to the seabed.

A common problem with existing devices designed to harvest significant amounts of energy from the sea is their complexity and cost. They are predominantly large structures, with rigid components, placed in a harsh environment. There is little use of well-proven components. Most devices proposed are very demanding in terms of engineering design, deployment and maintenance.

Other known devices which are used in the marine environment, although not designed for the conversion of wave energy to usable power, include that described in FR-A-2 488 339; which is designed to pump fluids from the sea-bed.

OBJECT OF THE INVENTION

It is an object of this present invention to provide an improved device for extracting energy from sea waves or a swell in a body of liquid.

SUMMARY OF THE INVENTION

Accordingly the invention provides: a wave energy conversion apparatus for harnessing energy from wave motion on the surface of a body of liquid comprising:

- at least one buoyant member of variable buoyancy for holding a substantially constant mass of gas in an at least partially submerged position in the body of liquid such that as the volume of the substantially constant mass of gas changes with changes of pressure on said buoyant member caused by wave motion a change in buoyancy of the variable buoyant member results; and
- a conversion means for converting said change in buoyancy of the buoyant member to an energy output device.

The apparatus preferably comprises further:

- a fixed load or non-variable opposing buoyancy connected to the variable buoyant member wherein said load acts to balance the buoyancy of said buoyancy member of variable buoyancy so as to maintain said buoyant member of variable buoyancy in a normal position such that said means for converting said change in buoyancy of the buoyant member of variable buoyancy operates in a double acting manner and
- a means whereby the variable buoyancy so loaded may react against the bottom or against a further vessel of non-variable buoyancy floating on the surface.

Preferably any such apparatus may be set up such that it may oscillate in resonance with prevailing wave frequencies.

Preferably said means for converting resulting forces or changes in forces in the apparatus to useful energy may be selected from one or more of the following:

(a) a hydraulic system
(b) a pneumatic system
(c) a mechanical system
(d) a piezo-electric system Preferably said means for converting said forces or changing forces in the apparatus converts said change to an output device which is selected from one or more of the following:

(a) an electricity generating device
(b) a device for the hydrolysis of water
(c) a pumping device
(d) a device for making potable water
(e) a device for extracting dissolved salts
(f) a hydraulic device
(g) a mechanical device The buoyant member of variable buoyancy preferably includes means for altering the volume of the buoyant member of variable buoyancy in response to changes in pressure on the buoyant member of variable buoyancy.

Said buoyant member of variable buoyancy may be constructed from a substantially air-tight non-rigid flexible or otherwise elastic material which may be subdivided into two or more compartments.

Alternatively said buoyant member of variable buoyancy may be constructed from a substantially rigid container, substantially open at the bottom, such that the changes in surrounding pressure causes a fluctuation in liquid level within the container. The container or vessel may have a series of apertures on the underside of the container allowing liquid to enter and leave the container, depending on the pressure of the head of liquid on the contained gas. One example would be an inverted bell, with one or more apertures of varying sizes cut into the base.

In one embodiment said load is a mass that may move up or down over a predefined range, and whose position is determined by the buoyancy of said buoyant member of variable buoyancy to which it is linked. The mass and buoyant member are preferably constrained in their movement by a fixed or relatively fixed structure and against which they can react. The fixed or relatively fixed structure may be a mast or vertical spar tethered to the seabed, or a floating vessel of fixed and greater buoyancy that may move in opposition when floating on waves or swell on the surface above.

In a further embodiment said load is a buoyant member of non-variable buoyancy attached to said buoyant member of variable buoyancy by a cable passing a pulley-type structure which acts to balance the buoyancy of the variable buoyancy in its normal condition.

The primary excitation forces arise from the vertical displacement in the waves and corresponding changes in hydrostatic pressures below.

The constant mass of gas within the variable buoyancy responds to changes in surrounding hydrostatic pressures by changes in volume and thus, by Archimedes Principle, experiences changes in upthrust. The volume changes may occur adiabatically or close to adiabatically and are governed by the elementary gas laws.

Power may be taken off by the reaction of the buoyant member of variable buoyancy against the bottom, or a float on the surface moving in opposition, or a submerged reaction plate, or all, or some combination of these.

Other advantages and features of the present invention will become apparent from the following detailed description, the accompanying drawings, and the appended claims.

DETAILED DESCRIPTION OF THE DRAWINGS

The invention provides a device for extracting energy from a fluid body based on the reaction of a submerged, sealed, and elastic or otherwise compressible device partially filled with air or other gas, to changes in pressure around it. These changes in pressure result from an overpassing ocean swell or changing surface levels in a tank.

Figure 1:
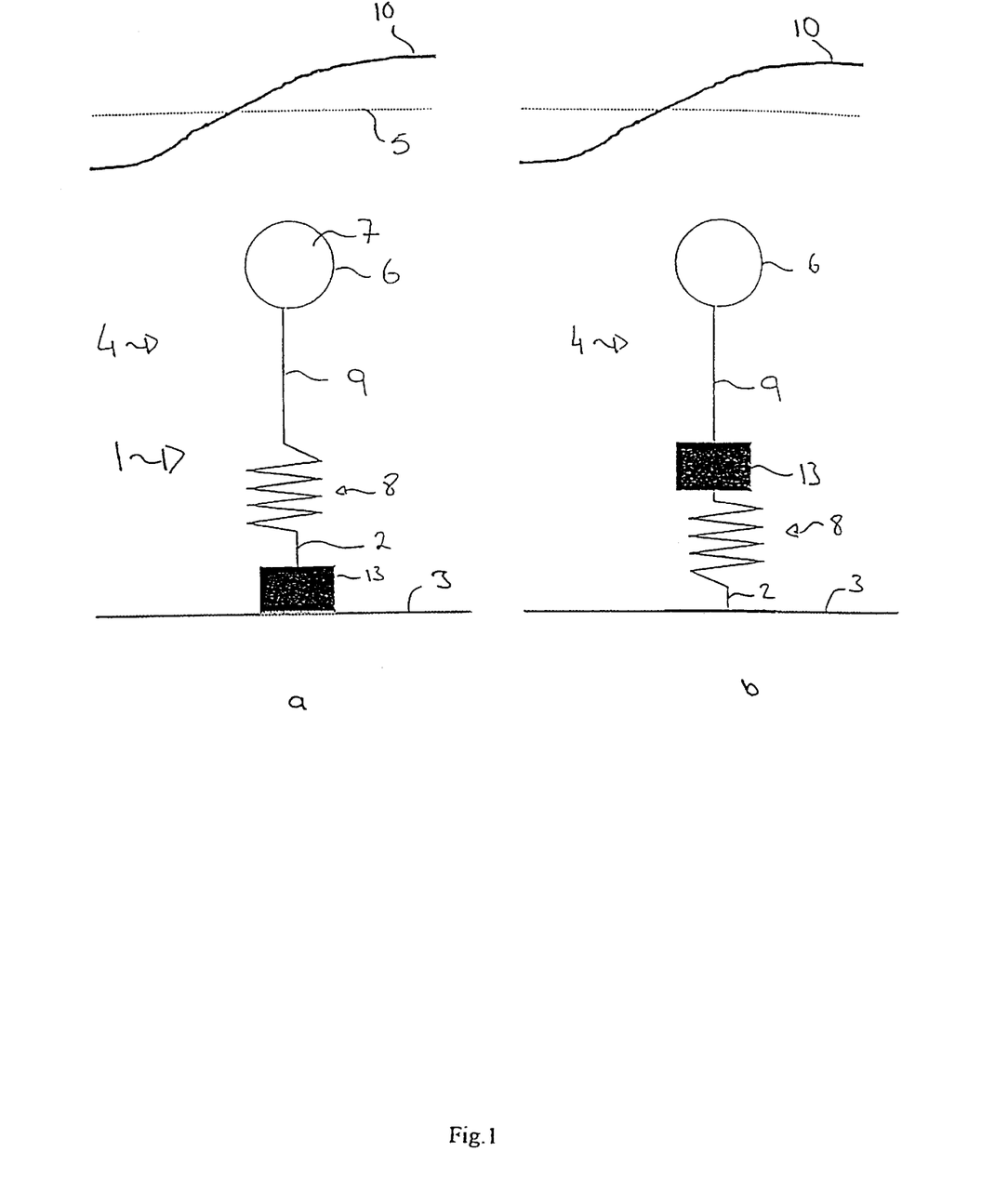
FIG. 1a is a schematic showing the principle of operation of a single acting device of the present invention.
FIG. 1b is a schematic showing the principle of operation of a double acting device of the present invention.

FIG. 1 is a schematic indicating two basic forms of the embodiments in which a wave energy converter 1 reacts against the bottom of the sea or tank. The converter 1 comprises a buoyant member of variable buoyancy 6, hereinafter referred to as an elastic member or variable buoyancy 6, a spring representing a power take-off means 8 and a mass 13, linked by cables 2, 9 and all under the surface of the body of liquid 4. The variable buoyancy contains a constant mass of gas 7, the volume of which is dependent on the pressure exerted by the body of water. A varying pressure will result in a change in volume of the gas, a change in volume of the elastic member and a resultant change in buoyancy of the variable buoyancy 6. The FIG. shows the position of the liquid surface at rest 5, a passing wave crest 10, and the bottom or seabed 3.

FIG. 1(a) is that referred to as a single-acting device, FIG. 1(b) as a doubleacting device. The basic operations of the two forms are further described in relation to FIGS. 2 and 4.

Figure 2:
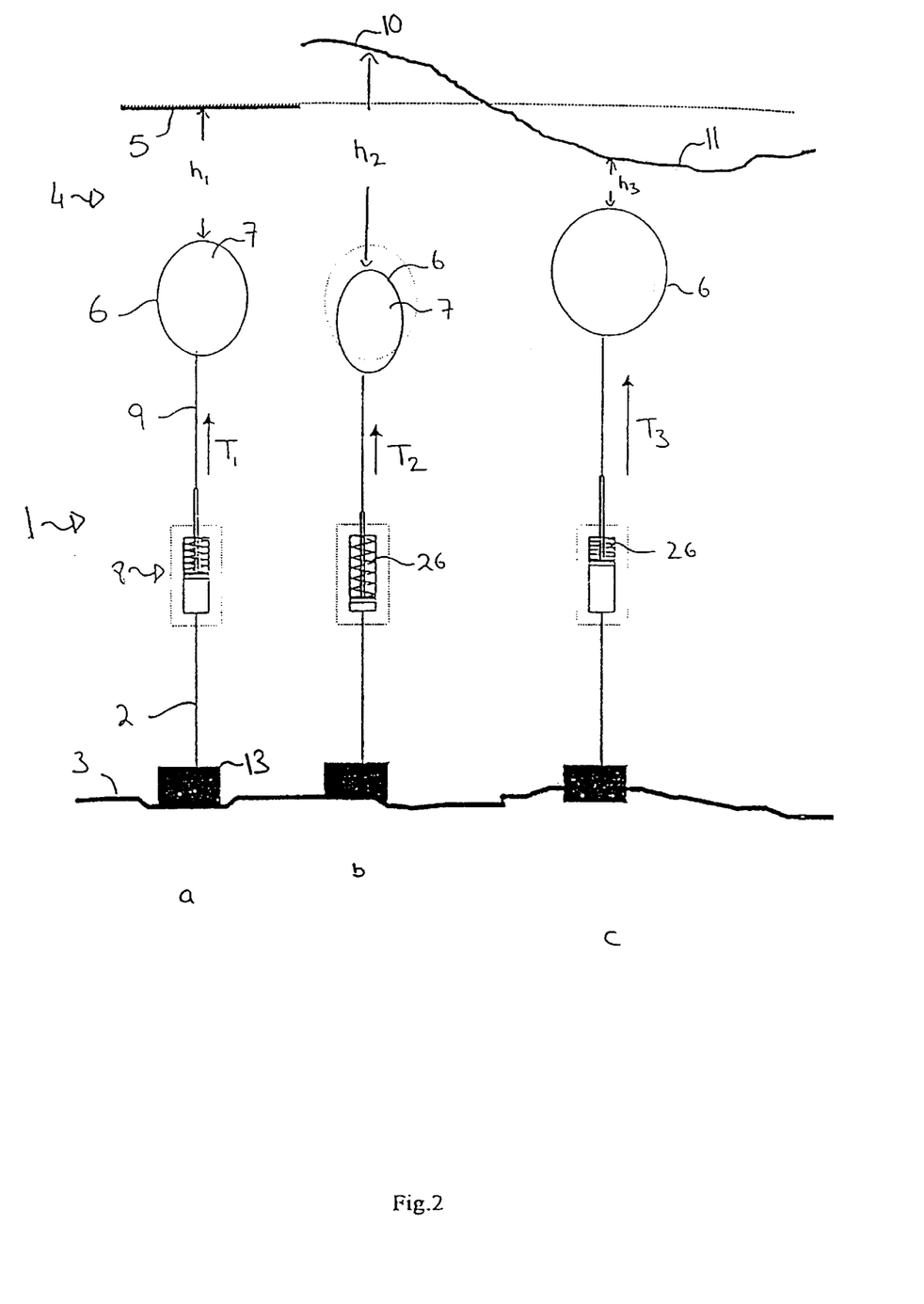
FIG. 2a shows the device of FIG. 1a under a flat surface of liquid.
FIG. 2b shows the device of FIG. 1a under a crest, such that the head of liquid above is increased.
FIG. 2c shows the device of FIG. 1a under a trough, such that the head of liquid above is reduced.

FIG. 2 shows the basic operation of a wave energy converter device 1 of type shown in FIG. 1a. FIG. 2a shows the variable buoyancy 6 moored, via an inelastic mooring line 2 (or cables), to the bottom 3 of a liquid mass 4, having a flat surface 5. In this single action embodiment, the variable buoyancy 6 is a balloon type structure, made of, or partly made of, elastic or otherwise flexible material that may change in shape and size according to the pressure exerted on the gas 7 contained therein. Preferably the balloon will be held in a net cage (not shown) and shaped so as to maximise the point effect, i.e. minimise the diameter of the balloon with respect to the wavelength of the over-passing wave, from the prevailing wave climate. The variable buoyancy 6 is attached to hydraulic actuators 8 via an anchoring cable 9. The pressure exerted on the gas 7 in the variable buoyancy 6 is equivalent to atmospheric pressure plus the pressure exerted by the height of the water column $h_1$. As a result of the buoyancy of the sealed gas 7, the variable buoyancy 6 is exerting a tension $T_1$ towards the surface, on the hydraulic actuator 8. This device is also suitable for reacting against a lever or pump type mechanism within a tank or process vessel.

FIG. 2b shows the situation when the surface 5 is not flat, equivalent to the occurrence of waves on a water surface. The device 1 is now under a crest 10 of a wave. As a result, the height of water column $h_2$ is greater than $h_1$. The effect of this is the exertion of more pressure on the quantity of gas 7. According to Boyle's Law pressure times volume (PV) is constant for constant temperature or, under conditions that will most probably favour adiabatic change, $PV^\gamma$ is constant where gamma tends towards 1.4 for air. Hence, as the pressure has increased, the volume of gas 7 within the variable buoyancy 6 contracts. The height $h_2$ is equivalent to the height of the wave crest 10 plus any downward movement of the variable buoyancy 6. Both components of $h_2$ act so as to increase the pressure on the elastic member 6 and cause a reduction in volume of the elastic member. According to Archimedes' Principle, as the volume of the elastic member 6 decreases and less liquid is displaced, the upthrust corresponding to the mass of water displaced will be lessened. The change in buoyancy, caused by the reduction in volume of the variable buoyancy 6, results in less tension $T_2$ being exerted on the hydraulic actuator 8.

FIG. 2c shows an equivalent situation for when the device 1 is under a trough 11 of a wave. The height $h_3$ is less than $h_1$, such that less pressure is being exerted on the gas 7, with a resultant increase in the volume of the elastic member 6. In a similar manner to that described with relation to FIG. 2b, $h_3$ is made up of two components; the depth of the trough 11 and the upward movement of the variable buoyancy 6. The increase in buoyancy of the elastic member 6 results in more tension $T_3$ being exerted on the actuator 8.

The movement of the variable buoyancy 6, which results from using a flexible balloon type arrangement, under the crest and trough adds a dynamic effect to the static effect caused by the passage of the passing wave.

The change in tension in the cable 9, arising from differing conditions illustrated in FIGS. 2b and 2c, is passed to the hydraulic actuator 8, displacing hydraulic fluid (not shown), which in turn powers a motor-generator set (not shown). In a preferred embodiment the actuators are of a variety called heave compensators, such as those regularly used to stabilise ship-borne drilling rigs in offshore oil exploration. The heave compensators may have an accumulator or air-cylinder, indicated by a spring 26, so as to return the main hydraulic cylinder to its normal position. The spring 26 is indicative of the reactive force which acts to compensate against the tension exerted on the actuator 8.

Figure 3:
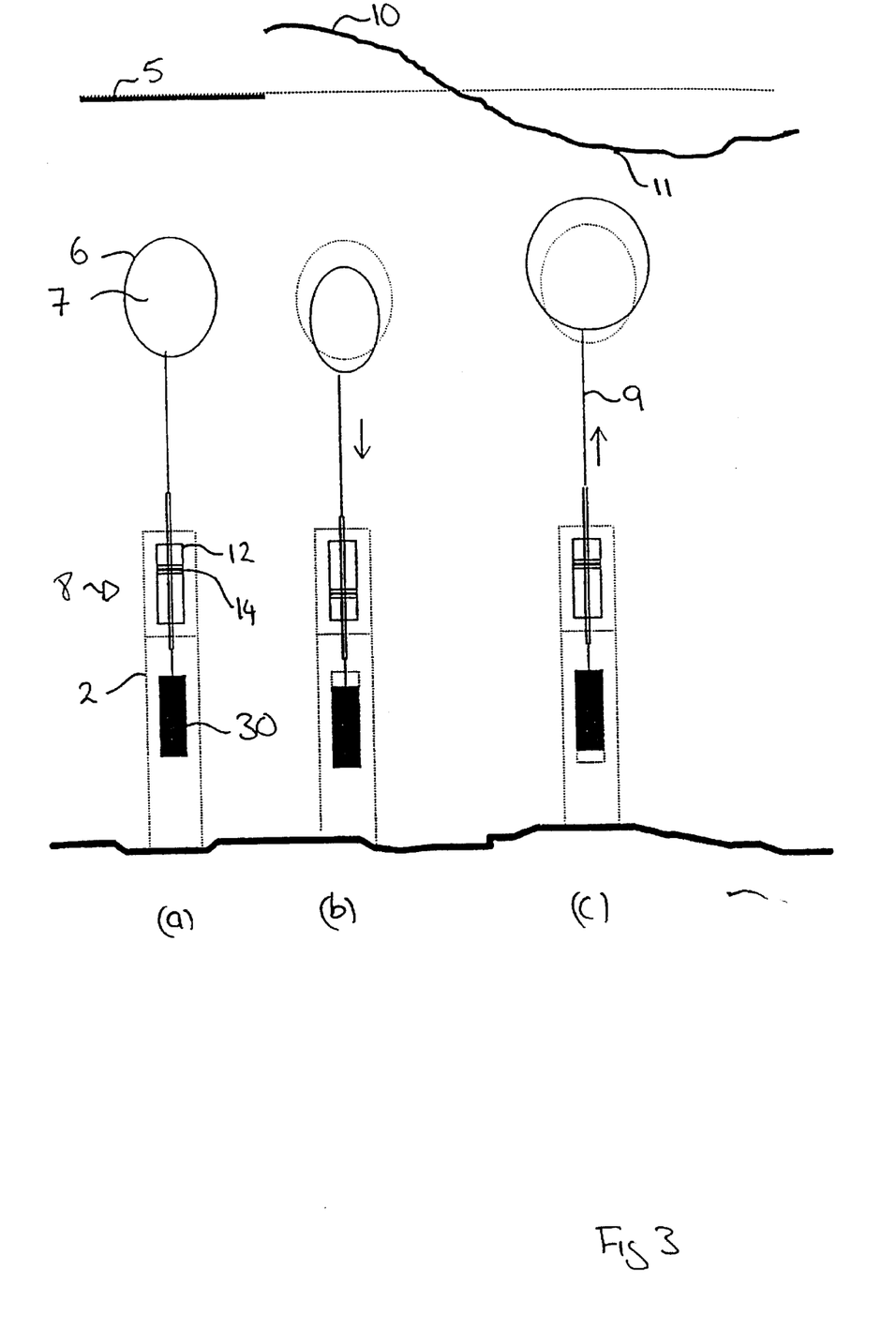
FIG. 3 shows an arrangement for the device of FIG. 1b combining a flexible vessel and a counterweight.

FIG. 3 illustrates the principle behind a second and further embodiment of the device 1, corresponding to that shown in FIG. 1b. The same reference numerals are used for like parts. In this embodiment the wave power converter is adapted to be a double-acting device, i.e. one that will provide power as the variable buoyancy 6 expands and moves up under a trough 11 (as already described) and also as it is compressed and moves down under a crest 10. Essentially, the upthrust experienced by the variable buoyancy or elastic member 6 in its neutral state (under a level sea) is balanced by a weight or load 30, the two being directly linked by a piston-rod 14 which runs through cylinder 12 of the heave compensator 8. The operation of the heave compensator 8 is now simplified, net changes in upthrust on the elastic vessel 6 result in corresponding forces acting on the piston rod 14. These will act, in a regular sea, by alternately pulling the rod 14 up and down. The displaced hydraulic fluid, under pressure, powers an electricity motor-generator set (not shown) and is then returned to the low pressure side of the heave compensator. More than as in the previous arrangement, return springs (not shown) will be required as the device as a whole is, in this arrangement, not in stable equilibrium in the neutral position. Reaction against the bottom is effected by rigid mooring lines or vertical spar 2.

Figure 4:
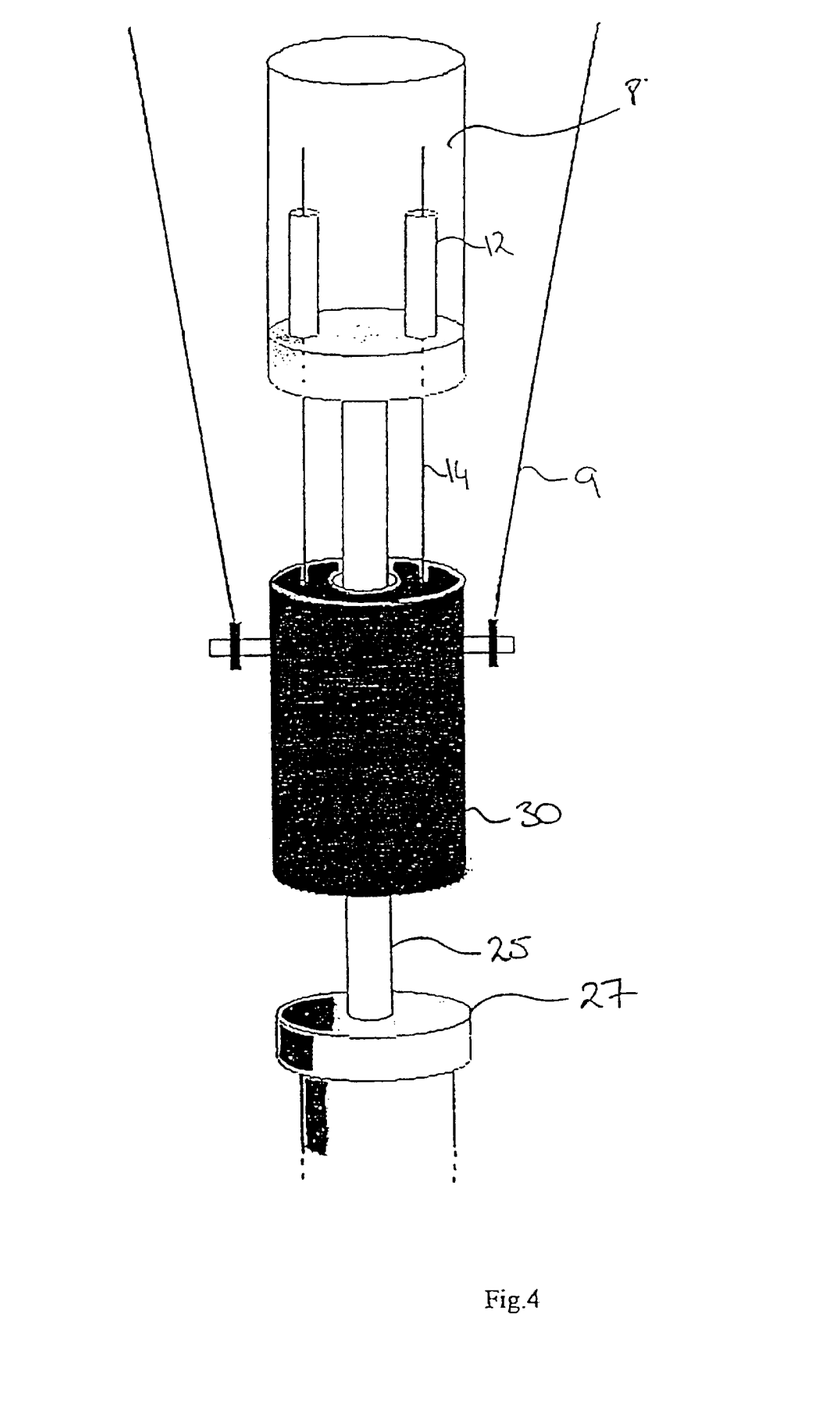
FIG. 4 shows a practical arrangement of the device of FIG. 3.

FIG. 4 shows a practical arrangement of the double acting embodiment of FIG. 3. The number and size of the hydraulic cylinders and air-springs is determined by the anticipated environment and the desirability or otherwise of matching oscillation of the device as a whole with the predominant wave climate. Two cables 9 connect the variable buoyancy (not shown) to a fixed or constant mass 30, which is free to move through a line of work dictated by a pillar 25 set on a vertical spar or column 27 resting or fixed to the bottom (not shown). As a result of the movement of the fixed mass 30, caused by the variation in buoyancy of the variable buoyancy member (not shown), piston rods 14 are driven through hydraulic cylinders 12 where the power can be taken off. In a modification to this embodiment (not shown) the hydraulic cylinders may be located below the fixed mass, but the mode of operation is the same.

Figure 5A:
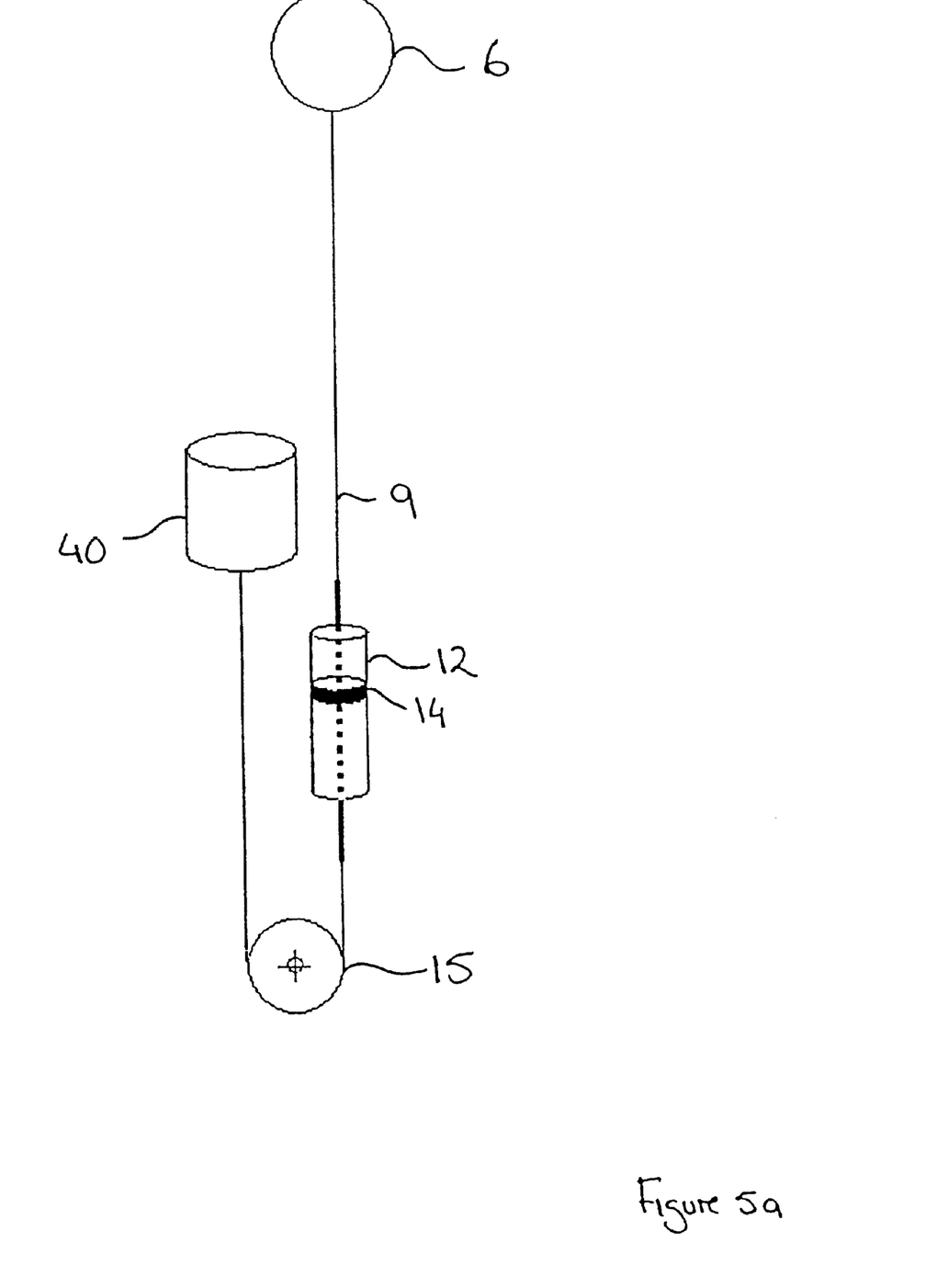
FIG. 5a shows an alternative embodiment of the device of FIG. 1b.
Figure 5B:
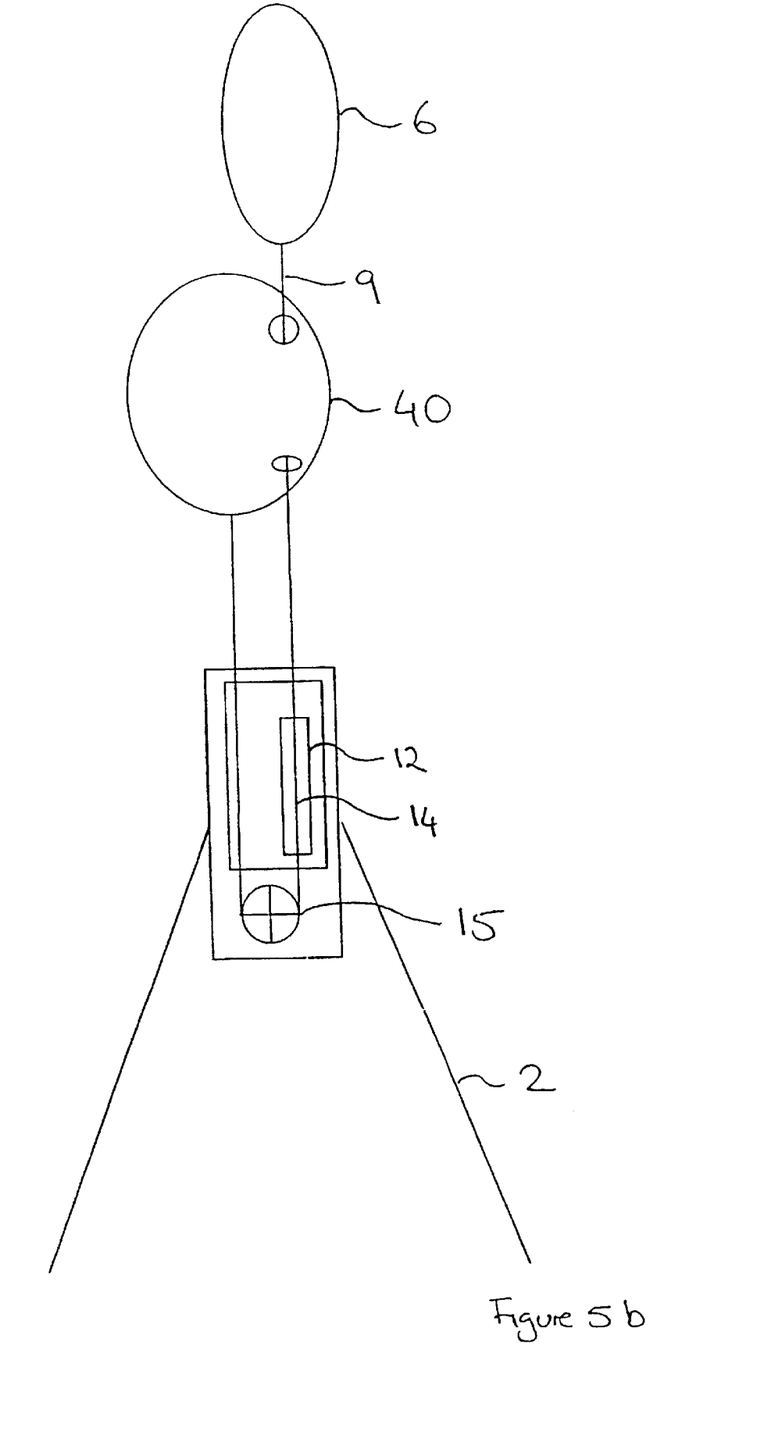
FIG. 5b shows an alternative embodiment of the device of FIG. 1a, FIG. 5c shows an alternative embodiment of the device of FIG. 5a, FIG. 6 is a schematic showing the principle of operation of an embodiment of the present invention wherein power is derived from the reaction against a floating vessel.

FIG. 5a shows an alternative embodiment of the double acting arrangement shown schematically in FIG. 1b. In this embodiment the variable buoyancy 6 is attached through a hydraulic cylinder 12, driving a piston rod 14, and via a pulley or pivot arrangement 15, to a non-variable buoyancy 40. The non-variable buoyancy 40 acts to counteract the effect of the tension exerted by the variable buoyancy 6. FIG. 5b shows an alternative embodiment in which the cable 9 from the variable buoyancy 6 passes through the non-variable buoyancy 40 so as to keep the two buoyancies in the same line of action. In the same manner as described with relation to FIGS. 1 to 4, the change in height of water column above the variable buoyancy, results in a change in volume of the variable buoyancy 6 with a resultant change in tension exerted through the pulley 15 and the non-variable buoyancy 40. In a situation of a flat surface the two buoyancies 6, 40 are balanced and there is no movement through the cylinder 12. The change in buoyancy of the elastic member 6, caused by a passage of crests and troughs passing overhead, results in the piston rod 14 moving through the cylinder 12. FIG. 5b shows the device reacting against the sea-bed (not shown) via the mooring cables 2. This embodiment is suited for work in process vessels and the cable may be replaced by a hinge or lever mechanism.

As with the previously described double-acting arrangement, the neutral position is not a position of stable equilibrium so the length of stroke is must be constrained. A system using springs (preferably air springs or hydraulic rams) is necessary to define the stroke and to provide a return force; this has the additional and important benefit of facilitating oscillation in resonance with the predominant wave frequency.

Figure 5C:
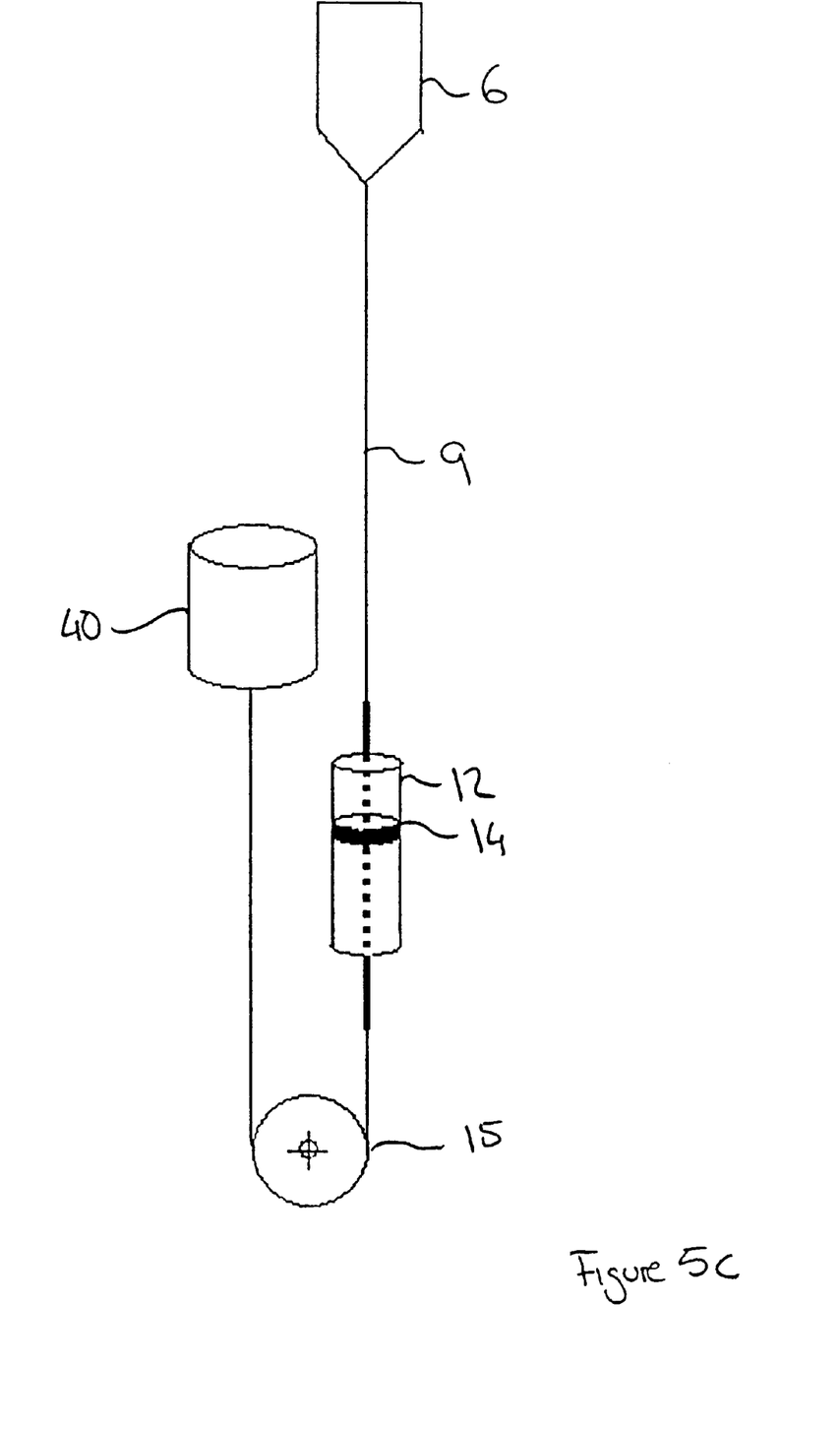

FIGS. 5c shows yet a further embodiment wherein the variable buoyancy 6 is formed from an inverted bell type structure. The same reference numerals are used for similar parts. This is a rigid vessel, at least partially open at the bottom, such that liquid can enter and leave the variable buoyancy. The amount of liquid contained within the variable buoyancy is dependant on the pressure exerted on the gas contained within the variable buoyancy. As the pressure increase, the volume of gas contained within the container 6 will decrease and liquid will enter from the bottom to takes its place. As the pressure increases the gas will expand, forcing the liquid to leave the container. The change in volume of gas within the variable buoyancy 6 will affect the buoyancy of the variable buoyancy, which will result in work being done about the pulley 15. The repeated increase and decrease in buoyancy of the variable buoyancy resulting may be used as a source of power in situations like tanker lorries, ships etc.

Figure 6:
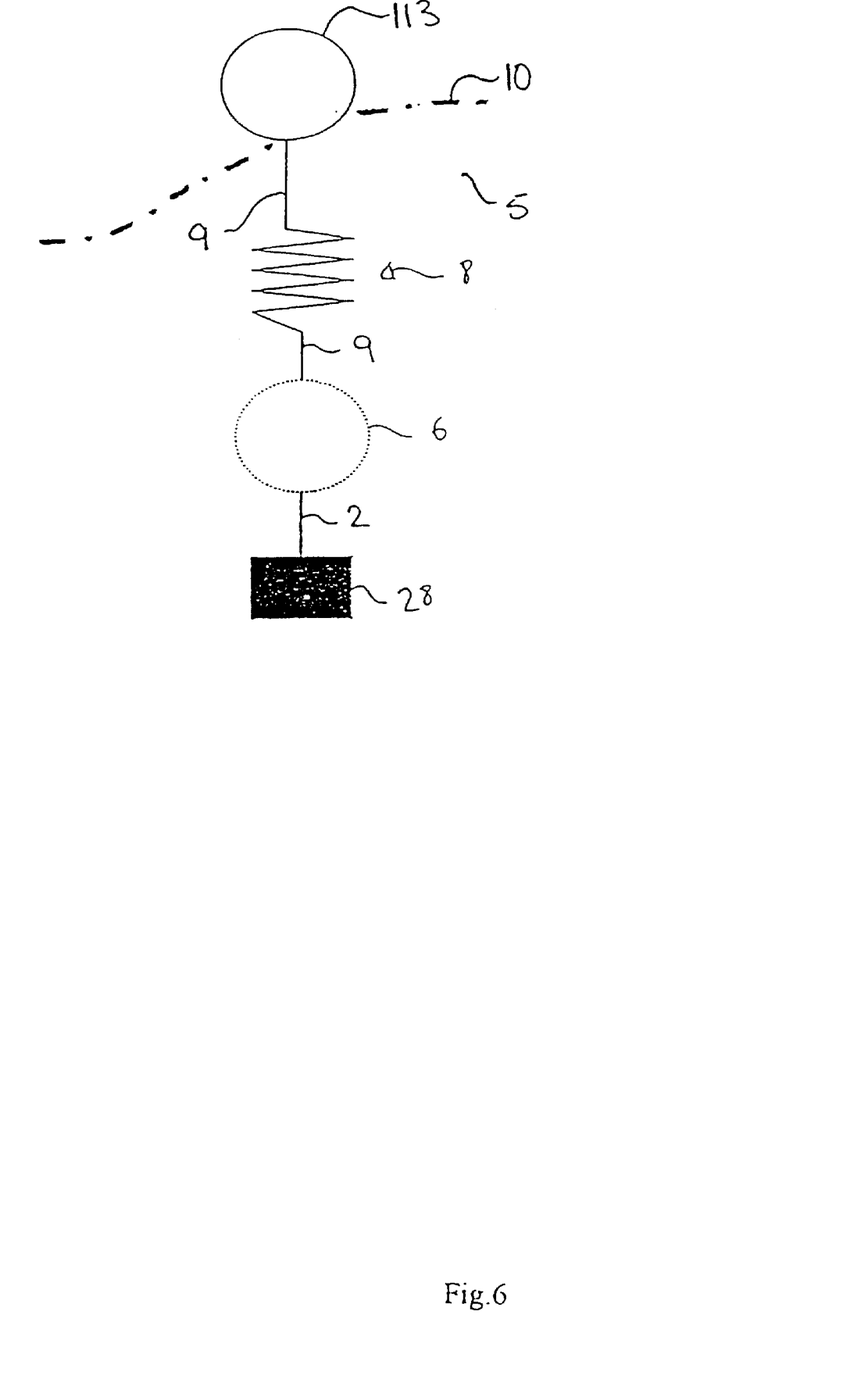

FIG. 6 is a schematic indicating the basic form of an embodiment in which the wave energy converter reacts against a vessel floating on the surface of the body of liquid. FIG. 6 shows the position of a liquid surface at rest 5, a passing crest 10, a floating vessel of fixed or non-variable buoyancy 113 linked to a submerged variable buoyancy 6 via cables 9 to the spring or power take-off 8 actuated by the relative motion of the two vessels, and a mass 28 that may act as a reaction plate that more than counterbalances the buoyancy of the variable buoyancy 6 even at its greatest buoyancy. The whole device is suspended from the floating member of fixed buoyancy 113 and the predominant motion is along a vertical axis. The significant feature is that the floating vessel of fixed buoyancy 113 and the submerged variable buoyancy 6 with its counterbalancing mass tend to move in opposite phase as waves pass, thus being in effect a two-body oscillator. The device may be moored using a slack mooring system (not shown) attached to the floating vessel.

Figure 7:
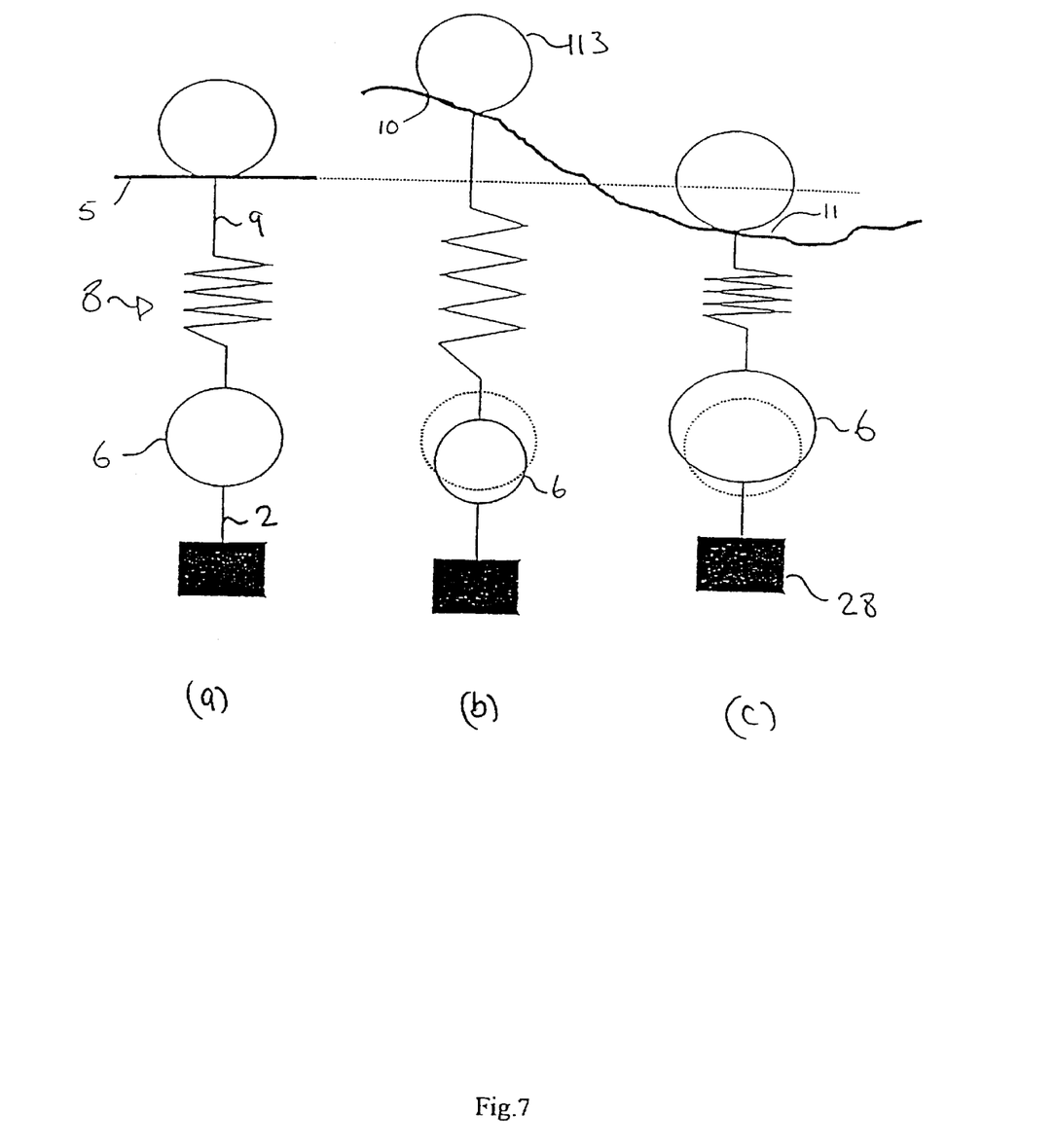
FIG. 7a is a schematic showing the device of FIG. 6 under a flat surface of liquid
FIG. 7b is a schematic showing the device of FIG. 6 under a crest, such that the head of liquid above has increased.
FIG. 7c is a schematic showing the device of FIG. 6 under a trough, such that the head of liquid is reduced.

FIG. 7 shows the basic operation of a device of type shown in FIG. 6. FIG. 7a shows the device at rest and a motionless surface 5. The variable buoyancy 6 is suspended, submerged, under the floating vessel of non-variable buoyancy 113. The two vessels are linked by means of cables or rods 9, and the spring representing the power take-off 8.

In FIG. 7b a wave crest 10 is passing which lifts the floating buoyancy 113. and, as previously explained, tends to reduce the buoyancy of the submerged variable buoyancy 6 and which, on account of the weight 28 below, will tend to sink. The reverse occurs during the passing of a trough 11 as in FIG. 7c, during which the submerged variable buoyancy 6 will tend to expand and rise. A preferred embodiment will incorporate rods rather than inelastic cables between the two vessels 6, 113 and the power take-off 8, thus allowing reactive forces to arise as they tend to come together. With a properly chosen stiffness for the power take-off 8, appropriate sizes for the two vessels 6, 113 and the weight 28, the device as whole may be arranged to oscillate with a particular frequency. The hydrodynamics and natural frequencies of this two-bodied oscillator will be influenced by the shapes of the vessels 6, 113.

Figure 8:
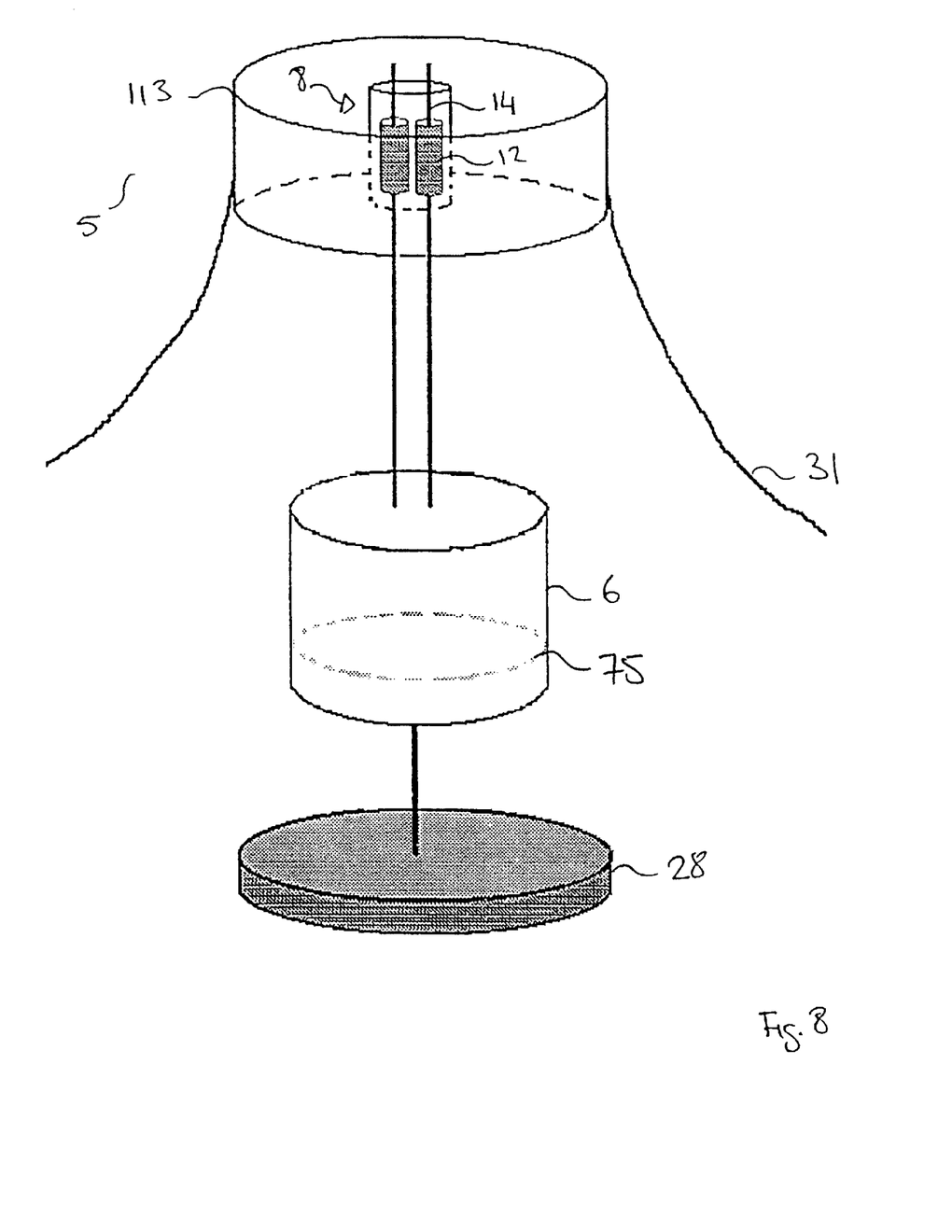
FIG. 8 shows a practical arrangement of the embodiment shown in FIG. 6.

FIG. 8 is a schematic of practical embodiment of the submerged variable buoyancy 6 arranged to react against a floating vessel of fixed buoyancy. The variable buoyancy 6 is an inverted bell type structure, as previously described with reference to FIG. 5c. As the pressure on the variable buoyancy changes the liquid level 75 within the container will also change. The power take-off 8, located in the floating vessel of non-variable buoyancy 113, is preferably mounted on gimbals or similar acting devices (not shown) to allow it and the floating vessel 113 a necessary degree of independent movement. The shapes of the two vessels 6, 113 shown in FIG. 8 may be quite different. The slack mooring system 31, and weight 28 are as previously described. The variable buoyancy may also be a container with a series of holes or apertures cut on the bottom.

Figure 9:
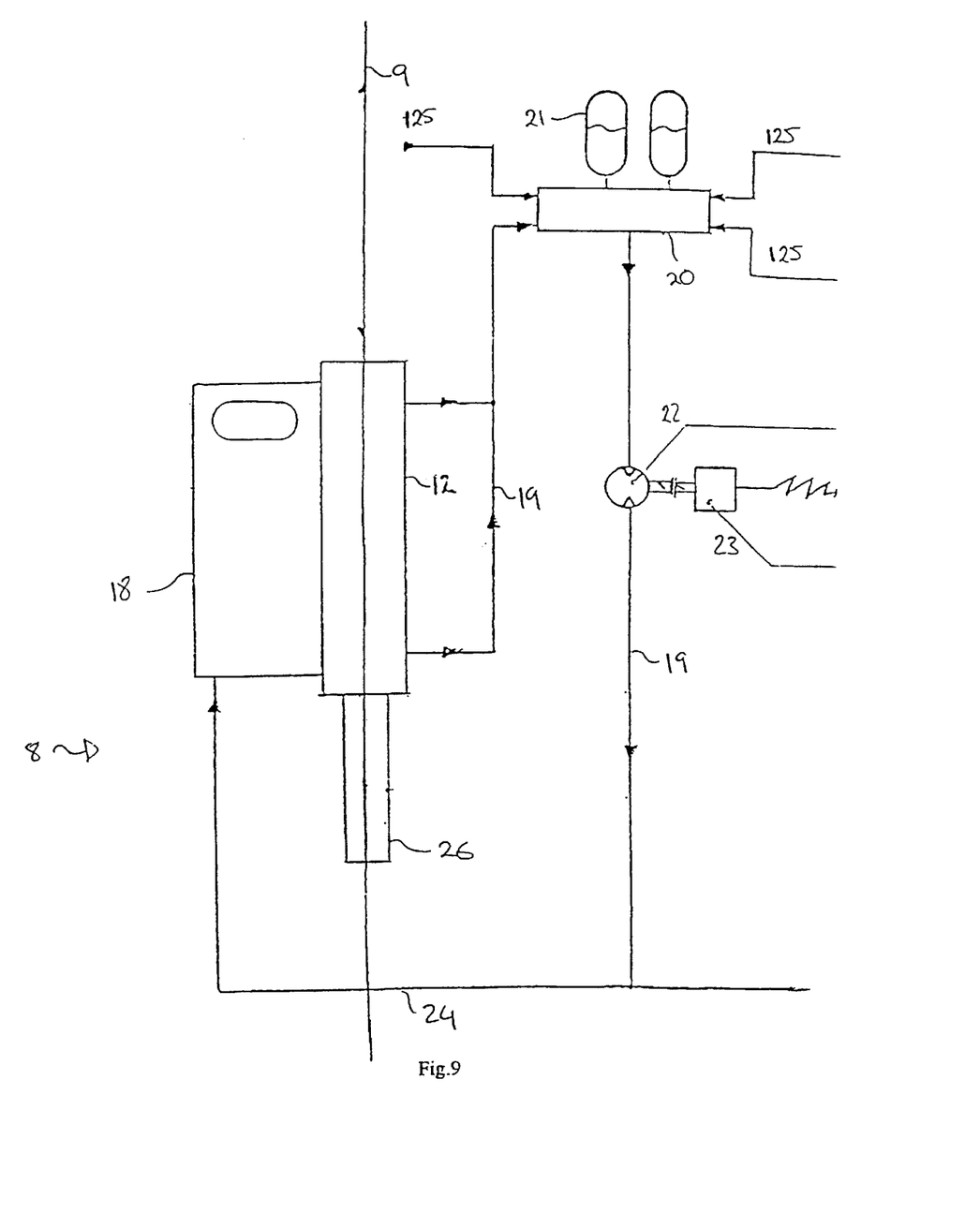
FIG. 9 is a schematic for a method of converting energy of motion using hydraulics and a motor alternator set.

FIG. 9 shows the principle of a preferred hydraulic system utilised in the double acting embodiment of the invention. The schematic shows the possible adaptation of the device to two or more devices. A double acting hydraulic cylinder 12 is attached to a hydraulic spring or counterweight 26 and has a self contained oil reservoir 18. The forces exerted by the variable buoyant member (not shown) displaces high pressure oil from the pump 16 through high pressure oil lines 19 to a distribution manifold 20 and high pressure oil accumulators 21. The displaced hydraulic fluid, under pressure, drives a hydraulic motor 22 which in turn powers an electricity motor-generator set 23, and is then returned to the low pressure side of the hydraulic pump 16 via a low pressure oil line 24.

Although each wave energy converter device may be deployed as an independent single entity, it may be desirable and expedient to arrange a number of similar devices in an array. For example two or more individual devices may be used to supply power in the form of hydraulic pressure to a common 'ring main' or an accumulator or a combination of these, and from which one or more motor-generator sets will be driven. Oil inputs from additional devices may be added at junction points 125.

Figure 10:
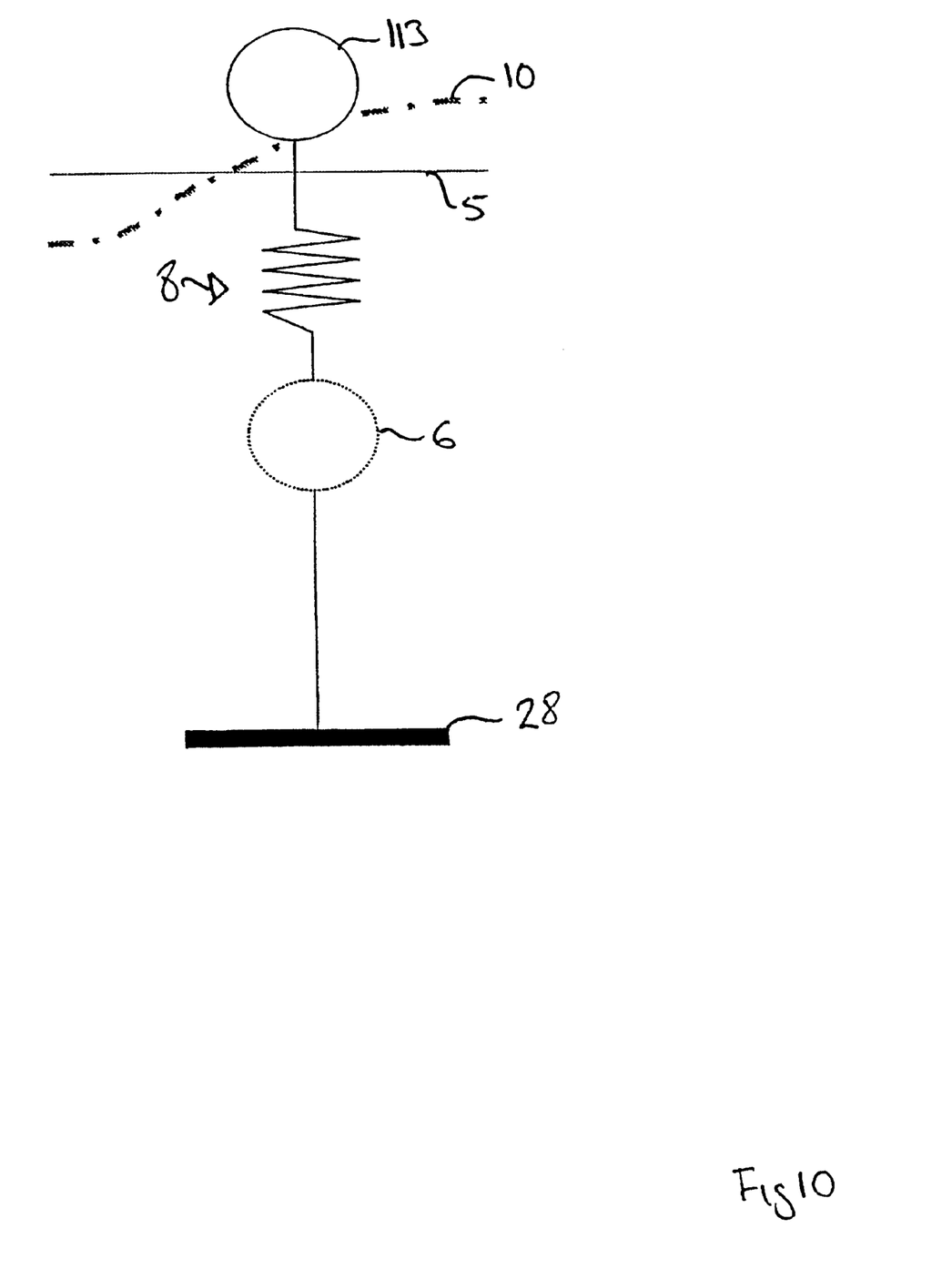
FIG. 10 is a schematic of a modification of the device of FIG. 6.

The water particles below any wave oscillate in harmony with the overpassing wave, and decreases with depth below the surface. Under monochromatic waves this movement of the water particles is circular in a vertical plane parallel to the direction of travel of the wave. Necessarily, the submerged variable buoyancy, which must be located where the hydrostatic pressures are also varying significantly, will experience these circular movements in the surrounding water. In order to negate the resulting vertical oscillation of the variable buoyancy in the case where it is reacting against a fixed buoyancy on the surface above, the fixed mass 28 may be extended so that its horizontal dimensions with respect to the surface are substantially greater than its vertical dimensions. A schematic of such an extended fixed mass is shown in FIG. 10. As is shown the fixed mass 28 forms a horizontal reaction plate which may be suspended at a depth below where the vertical component of the motion of the water particles is significant. There may also be tidal flows or drifts, typically two to three knots or less. In theory a smooth vertical cylinder experiences no net lateral force from a fluid flowing smoothly past it horizontally.

The cables or rods linking the variable buoyancy with other elements could be inelastic but not rigid; individual rods may incorporate a link or hinge or pivot. For those embodiments that react against the bottom through a vertical spar, as shown in FIGS. 1 to 5, this may be stayed firmly but not necessarily absolutely rigidly. This general approach to design is to allow some flexing and lateral movement of the device and in particular the submerged elements.

The scale of the change in forces that may be expected with a typical configuration of the wave energy converter device developed for ocean wave power conversion, with a 50 m$^3$ vessel under a wave of amplitude one metre above level seas, will be of the order of plus or minus 70 tonnes every few seconds. Larger vessels can be deployed, the limiting factors being the predominant wavelength and the fall-off with depth of the pressure variation due to surface waves.

In any of the aforementioned described embodiments the hydraulic cylinder, accumulator and motor generator will be accommodated in an 'engine room', preferentially capable of being detached for maintenance purposes. In the embodiments where this is underwater it may be an air-tight or inverted bell type structure that will allow diver access for maintenance purposes and incorporate sufficient positive buoyancy to prevent it sinking, in the event of the effect of the variable buoyancy being removed. In those embodiments where there is a floating buoyancy on the surface, the engine room may be placed within the floating body, as shown in FIG. 8.

Where the variable buoyancy comprises a balloon type structure it is envisaged that this may be divided into several non-interacting chambers, so as to reduce the possibility of an incapacitating lack of buoyancy should a leak occur. The weight attached to the lower end of the piston rod in the double-acting embodiment shown in FIG. 4 may be of an adjustable mass, effected by an integral chamber that may be air filled or flooded with water. The balloon type structure may be manufactured from, for example, a neoprene or fabric reinforced PVC material, or similar material. The elasticity of the material is not essential, what is important is that the material is flexible and may alter its shape and volume.

The buoyant member of variable buoyancy may be further modified to include vanes or plates, which may be rigid or moveable in form, and serve to alter the drag coefficient of the variable buoyancy. This will affect the upward and downward movement of the variable buoyancy.

The device, in any marine embodiment, is intended to be located away from the shoreline and outside the zone of impacting breaking waves. This will result in a more constant generation of power than other point absorber devices. In those embodiments with a floating buoyancy on the surface, the floating vessel will be hermetically sealed, partitioned internally, and will have minimal resistance to breaking seas or very large waves. It may readily be designed such that exceptionally steep waves or breaking seas will pass over it, a form of hydrostatic clipping.

The wave energy converter will continue to perform effectively in irregular seas, a condition that is more usual than regular monochromatic wave forms. Very frequently the waves are the result of two or more patterns superimposed, with perhaps an underlying long wavelength swell where the chosen site is open to the ocean and prevailing wind directions. The design imperative is to obtain usefull power at low cost, i.e. to optimise the unit cost of power delivered, rather than to seek to achieve the conversion of the maximum amount of the available wave power.

The device of the present invention is a simple, robust and low-cost device which maximises the use of proven components and technology. By utilising a flexible elastic member, the device is free to move with the prevailing conditions and does not require heavy engineering. As such it is possible to maximise availability and simplify maintenance of deployed power conversion devices, which may deployed singularly or in large arrays. This may allow the sharing of a common functionality between several devices. The devices are designed be independent of tidal changes in mean sea levels, have minimum dependence on wave directions and maximise the return from long wavelength ocean swell. By utilising the advantages offered by totally or partially submerged devices it is possible to move out beyond the shore line and the breaking wave zone and generate of the order of 0.5 MW or more per device.

What is claimed is:

1. An apparatus for harnessing energy from wave motion (10, 11) on the surface (5) of a body of liquid (4) comprising:
    at least one buoyant member of variable buoyancy (6) for holding a substantially constant mass of gas (7) in an at least partially submerged position in the body of liquid (4), such that as the volume of the substantially constant mass of gas (7) changes with changes of pressure on the buoyant member (6) caused by the wave motion (10, 11) on the liquid body (4), a change in buoyancy of the variable buoyant member (6) results;
    and a conversion means (8) for converting said change in buoyancy of the buoyant member to an energy output device.

2. The apparatus as claimed in claim 1 wherein the buoyant member of variable buoyancy (6) includes means for altering the volume of the buoyant member of variable buoyancy (6) in response to changes in pressure on the buoyant member of variable buoyancy (6).

3. The apparatus as claimed in claim 1 wherein the buoyant member of variable buoyancy (6) is constructed from a substantially air-tight, flexible or otherwise elastic material, whereby the volume of the buoyant member of variable buoyancy (6) may alter in response to changes in pressure on the buoyant member to alter the buoyancy of the buoyant member of variable buoyancy (6).

4. The apparatus as claimed in claim 1 wherein the variable buoyancy (6) may be subdivided into two or more compartments.

5. The apparatus as claimed in claim 1 wherein the buoyant member of variable buoyancy (6) may be constructed from a substantially rigid container, at least partially open at the bottom, such that the change in surrounding pressure causes a fluctuation in liquid level within the container to alter the buoyancy of the buoyant member of variable buoyancy (6).

6. The apparatus as claimed in claim 1 wherein the variable buoyancy (6) is adapted to incorporate vanes or plates.

7. The apparatus as claimed in claim 1 characterised in that the variable buoyancy (6) is coupled by coupling means (9) to the conversion means (8).

8. The apparatus as claimed in claim 1 characterised in that the conversion means (8) is coupled by coupling means (2) to the bottom (3) of the liquid body (4).

9. The apparatus as claimed in claim 1 further comprising a fixed mass (30) connected to the variable buoyancy (6), characterised in that the fixed mass (30) moves in response to changes in buoyancy of the variable buoyancy (6).

10. The apparatus as claimed in claim 9 characterised in that the fixed mass (30) is coupled to the conversion means (8) and the movement of the fixed mass (30) drives a piston rod (14) through hydraulic cylinders (12).

11. The apparatus as claimed in claim 1 further comprising at least one buoyant member of constant, non-variable buoyancy (113) suitable for floating on the surface (5) of the liquid (4), characterised in that the non-variable buoyancy (113) is coupled via power conversion means (8) to the variable buoyancy (6), located beneath the surface of the liquid (4), and the variable buoyancy (6) is coupled to a fixed mass (28).

12. The apparatus as claimed in claim 11 characterised in that the non-variable buoyancy (113) moves with the wave motion (10, 11), and this movement causes the non-variable buoyancy (113) to exert a force on the power conversion means (8) opposite in direction to that exerted by the variable buoyancy (6), and the conversion means (8) is actuated by the relative movement of the non-variable (113) and variable (6) buoyancies.

13. The apparatus as claimed in claim 11 wherein the fixed mass (30,28) acts to balance the buoyancy of said buoyant member of variable buoyancy (6), so as to maintain said buoyant member of variable buoyancy (6) in a normal position, such that said means (8) for converting said change in buoyancy of the buoyant member of variable buoyancy (6) operates in a double acting manner.

14. The apparatus as claimed in claim 1 wherein said conversion means (8) for converting said change in buoyancy of the buoyant member of variable buoyancy (6) may be selected from one or more of the following;
    a) a hydraulic system,
    b) a pneumatic system,
    c) a mechanical system.

15. The apparatus as claimed in claim 1 wherein said conversion means (8) for converting said change in buoyancy of said buoyant member of variable buoyancy, converts said change to an output device which is selected from one or more of the following;
    a) an electricity generating device,
    b) a device for the hydrolysis of water,
    c) a pumping device,
    d) a device for making potable water,
    e) a device for extracting dissolved salts,
    f) a hydraulic device,
    g) a mechanical device.

16. The apparatus as claimed in claim 9 wherein said fixed mass is a buoyant member of non-variable buoyancy (40) attached to the variable buoyancy and which acts to compensate for the variation in buoyancy of said buoyant member of variable buoyancy.

17. The apparatus as claimed in claim 16 wherein the buoyant member of non-variable buoyancy (40) is attached to the buoyant member of variable buoyancy by a tethering means passing around a pulley (15) situated below the variable buoyancy and non-variable buoyancy, such that any movement of the variable buoyancy causes an equivalent movement in the non-variable buoyancy.

18. The apparatus as claimed in claim 16 wherein the bouyant member of non-variable buouyancy (40) is connected to the variable buoyancy (6) via a pivot or fulcrum, which is adapted to convert any relative movement of the two buoyancies (40, 6) to an energy output device.

19. The apparatus as claimed in claim 1 characterised in that any change in buoyancy of the variable buoyancy (6) causes the variable buoyancy (6) to move relative to the bottom (3) of the body of liquid (4).

20. The apparatus as claimed in claim 1 wherein two or more buoyant members of variable buoyancies are connected to the same conversion means (8) such that the conversion means converts the changes in buoyancy from the two or more buoyant members to an output device.

21. A wave energy harnessing apparatus for harnessing energy from wave motion (10, 11) on the surface (5) of a body of liquid (4) comprising:
    a) at least one non-variable buoyancy (113) which, in turn, is coupled to, b) a power conversion means (8) which, in turn, is coupled to, c) at least one buoyant member of variable buoyancy (6) for holding a substantially constant mass of gas (7) in a submerged position in the body of liquid (4) which, in turn, is coupled to, d) a mass (28) of sufficient buoyancy to substantially counterbalance the buoyancy of the variable buoyancy (6).

22. The apparatus as claimed in claim 21 characterised in that the volume of the substantially constant mass of gas (7) is variable in response to the change of pressure on the buoyant member (6) caused by the wave motion (10, 11) and this variation in volume of the substantially constant mass of gas (7) causes a change in buoyancy of the variable buoyancy (6).

23. The apparatus as claimed in claim 21 characterised in that the power conversion means (8) is actuated by the relative movement of the non-variable (113) and variable (6) buoyancies.

24. The apparatus as claimed in claim 21 wherein the buoyant member of variable buoyancy (6) includes means for altering the volume of the buoyant member of variable buoyancy (6) in response to changes in pressure on the buoyant member of variable buoyancy (6).

25. The apparatus as claimed in claim 21 wherein, the buoyant member of variable buoyancy (6) is constructed from a substantially air-tight, flexible or otherwise elastic material, wherein the change in buoyancy of the variable buoyancy (6) results from a change in volume of the variable buoyancy (6).

26. The apparatus as claimed in claim 21 wherein the variable buoyancy (6) may be subdivided into two or more compartments.

27. The apparatus as claimed in claim 21 wherein the buoyant member of variable buoyancy (6) may be constructed from a substantially rigid container, at least partially open at the bottom, such that the change in surrounding pressure causes a fluctuation in liquid level within the container.

28. The apparatus as claimed in claim 11 wherein the conversion means (8) is substantially located within the non-variable buoyancy (113).

29. The apparatus as claimed in claim 1 wherein the variable buoyancy (6) is adapted to incorporate vanes or plates.

* * * * *